(12) United States Patent
Fluck et al.

(10) Patent No.: US 8,153,577 B2
(45) Date of Patent: Apr. 10, 2012

(54) METHODS FOR CLEANING RECYCLABLE SUBSTRATES OR CONTAINERS

(75) Inventors: David Fluck, Elkton, MD (US); Amit Sehgal, Marlton, NJ (US); Satyen Trivedi, East Windsor, NJ (US)

(73) Assignee: Rhodia Operations, Aubervilliers (FR)

( * ) Notice: Subject to any disclaimer, the term of this patent is extended or adjusted under 35 U.S.C. 154(b) by 0 days.

(21) Appl. No.: 12/806,444

(22) Filed: Aug. 12, 2010

(65) Prior Publication Data

US 2011/0039749 A1    Feb. 17, 2011

Related U.S. Application Data

(60) Provisional application No. 61/274,036, filed on Aug. 12, 2009.

(51) Int. Cl.
*C11D 3/20* (2006.01)
*C11D 7/50* (2006.01)

(52) U.S. Cl. ........ 510/417; 510/418; 510/420; 510/437; 510/438

(58) Field of Classification Search .................. 510/417, 510/418, 420, 437, 438
See application file for complete search history.

(56) References Cited

U.S. PATENT DOCUMENTS

| | | | |
|---|---|---|---|
| 3,930,988 A | 1/1976 | Johnson | 208/182 |
| 4,051,024 A | 9/1977 | Lowe et al. | 210/30 A |
| 4,623,748 A | 11/1986 | Johnson | 560/204 |
| 4,927,556 A | 5/1990 | Pokorny | 252/173 |
| 5,639,383 A | 6/1997 | Gajas Fuertes et al. | 210/774 |
| 5,670,701 A * | 9/1997 | Denis et al. | 560/204 |
| 6,090,769 A | 7/2000 | Vlasblom | 510/365 |
| 6,415,614 B1 * | 7/2002 | Greenfield et al. | 62/112 |
| 7,786,179 B2 * | 8/2010 | Talingting-Pabalan et al. | 516/181 |
| 2006/0135683 A1 | 6/2006 | Adam et al. | 524/556 |
| 2009/0149557 A1 * | 6/2009 | Talingting-Pabalan et al. | 516/182 |
| 2009/0224204 A1 * | 9/2009 | Marion et al. | 252/364 |
| 2009/0281012 A1 * | 11/2009 | Trivedi et al. | 510/138 |
| 2011/0021398 A1 * | 1/2011 | Allef et al. | 510/138 |

FOREIGN PATENT DOCUMENTS

WO    WO 94/11471    5/1994

OTHER PUBLICATIONS

F M Ghuiba & O M O Habib, "The use of Egyptian Fusel Oil for the Preparation of Some Plasticizers Compatible with Polyvinyl Chloride", Indian Journal of Technology, vol. 23, Aug. 1985, pp. 309-311.

* cited by examiner

*Primary Examiner* — Gregory Webb

(57) ABSTRACT

A method for treating a contaminated substrate comprising the steps of contacting an emulsion to a substrate surface soiled with one or more contaminants, the emulsion comprising a blend of dibasic esters, whereby the emulsion is capable of emulsifying all or some of the contaminants, forming a resulting emulsion; removing substantially all of the resulting emulsion from the substrate surface; and, optionally, in recovering the contaminant, adding an amount of water or a solvent to the resulting emulsion effective to form at least a first phase layer comprising a substantial amount of the contaminant and a second phase layer comprising a substantial amount of the emulsion. The dibasic esters can be a blend of adipic, glutaric, and succinic diacids, and, in one particular embodiment, the blend comprises dialkyl methylglutarate and dialkyl ethylsuccinate, wherein the alkyl groups individually comprise a $C_1$-$C_{12}$ hydrocarbon group. The one or more surfactants and additional components can be added.

22 Claims, No Drawings

METHODS FOR CLEANING RECYCLABLE SUBSTRATES OR CONTAINERS

CROSS REFERENCE TO RELATED APPLICATIONS

This application claims the benefit of U.S. Provisional Application Ser. No. 61/274,036, filed Aug. 12, 2009, herein incorporated by reference.

FIELD OF THE INVENTION

This invention relates to cleaning compositions and methods for cleaning recyclable substrates and in particular methods utilizing environmentally friendly cleaning compositions for removing oil and/or other contaminants from recyclable substrates that include plastic containers.

BACKGROUND OF THE INVENTION

Plastic oil containers used for automotive engine oil changes are usually discarded after use, for example, after an oil change. However, some oil remains in the plastic oil containers after most of the oil has been transferred out of the bottle, as a residue or film on the interior walls of the plastic container, i.e., residue oil. It is estimated that up to 10% of the virgin oil in the plastic bottle is lost as residue when the plastic containers are disposed (for example, after an oil change). There is an environmental impact as a result of the residue oil eventually ending up in landfills. The plastic oil containers can be recycled and extruded into virgin plastic, but the oil must be removed before processing which could be costly. This significant amount of residue oil should be recycled for both economical as well as environmental reasons.

SUMMARY OF THE INVENTION

The present invention will become apparent from the following detailed description and examples, which comprises in one aspect, is a method for treating a contaminated substrate comprising the steps of a) contacting an emulsion to a substrate surface soiled with one or more contaminants, the emulsion comprising a blend of dibasic esters, whereby the emulsion is capable of emulsifying all or some of the contaminants, forming a resulting emulsion (i.e., the emulsion with contaminants); and b) removing all or substantially all of the resulting emulsion from the substrate surface. In one embodiment, the one or more contaminants comprises residue oil, e.g., motor oil used in engines. In one embodiment, the substrate is a recyclable plastic substrate. In one embodiment, blend of dibasic esters has a general formula:

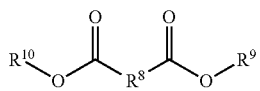
(I)

wherein $R^9$ and $R^{10}$ independently comprise a hydrocarbon chain containing about 1 to about 10 carbon atoms, and wherein $R^8$ is a mixture of at least two of —CH$_2$—CH$_2$—CH$_2$—CH$_2$—, —CH(CH$_3$)—CH$_2$—CH$_2$—, and —CH(C$_2$H$_5$)—CH$_2$—.

In one embodiment, the blend of dibasic esters comprises:
(i) about 7-14%, by weight of the blend, a dibasic ester of formula:

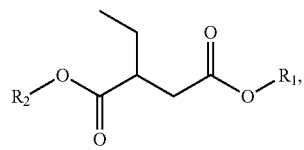

(ii) about 80-94%, by weight of the blend, a dibasic ester of formula

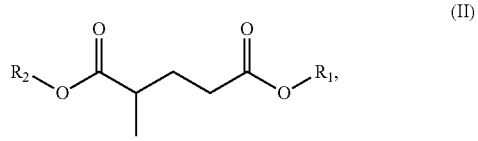

and
(iii) about 0.5-5%, by weight of the blend, a dibasic ester of formula

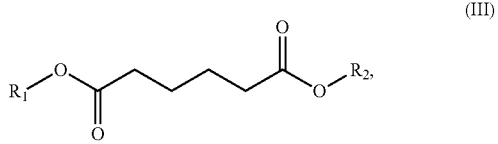

wherein $R_1$ and $R_2$ individually comprise a $C_1$-$C_{10}$ hydrocarbon group.

In yet another embodiment, the emulsion comprises: (a) a blend of dibasic esters comprising (i) a dialkyl methylglutarate and (ii) at least one of a dialkyl adipate or a dialkyl ethylsuccinate; and (b) a surfactant selected from the group consisting of an anionic surfactant, a cationic surfactant, an amphoteric surfactant, a zwitterionic surfactant, a nonionic surfactant and any combination thereof.

If the contaminant is desired to be recycled or recovered from the emulsion, the method can further comprise the step of: c) adding an amount of water or a solvent to the resulting emulsion effective to form at least a first phase layer comprising a substantial amount of the contaminant and a second phase layer comprising a substantial amount of the emulsion and, optionally, d) applying or imparting a force to the resulting emulsion, whereby the force promotes phase separation of the resulting emulsion. In one embodiment, the emulsion is a microemulsion. In one embodiment, the force is centrifugal force.

In one embodiment, the method can further comprising the step of: adding an effective amount of one or more destabilizing additives to the resulting emulsion, thereby forming at least a first phase layer comprising all, some or a substantial amount of the contaminant and a second phase layer comprising all, some or a substantial amount of the emulsion.

In one embodiment, the method can further comprising the step of c) heating the resulting emulsion to a predetermined temperature, thereby forming at least a first phase layer comprising a substantial amount of contaminants and a second phase layer comprising a substantial amount of the emulsion.

In another aspect, disclosed are methods of recovering a contaminant from a substrate comprising: a) contacting an emulsion to a substrate surface soiled with at least one contaminant, the emulsion comprising a blend of dibasic esters, whereby the emulsion is capable of emulsifying all or a portion of at least one contaminant, forming a resulting emulsion; b) separating substantially all of the resulting emulsion from the substrate surface; c) adding an amount of water or a solvent to the resulting emulsion effective to form at least a first phase layer comprising a substantial amount of the contaminant and a second phase layer comprising a substantial amount of the emulsion; and d) removing the first phase layer by known methods including but not limited to filtration. In one embodiment, water is added in step c) until phase separation is visibly observed.

In one embodiment, the blend comprises:

(i) about 7-14%, by weight of the blend, a dibasic ester of formula:

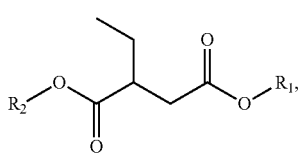

(ii) about 80-94%, by weight of the blend, a dibasic ester of formula

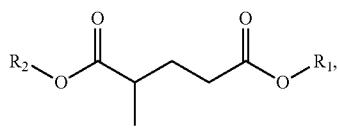

and (iii) about 0.5-5%, by weight of the blend, a dibasic ester of formula

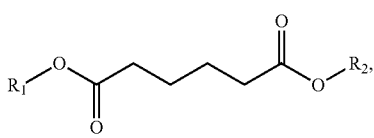

wherein $R_1$ and $R_2$ each independently comprise a $C_1$-$C_{10}$ hydrocarbon group, with or without heteroatoms.

In another aspect, disclosed are methods of recovering residue oil from a substrate comprising: a) contacting an emulsion to a substrate surface soiled with residue oil, the emulsion comprising a blend of dibasic esters:

(i) about 7-14%, by weight of the blend, a dibasic ester of formula:

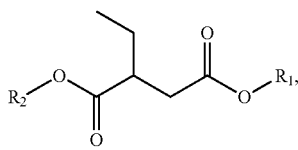

(ii) about 80-94%, by weight of the blend, a dibasic ester of formula

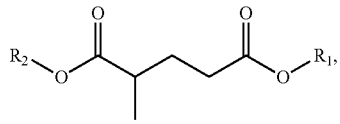

and (iii) about 0.5-5%, by weight of the blend, a dibasic ester of formula

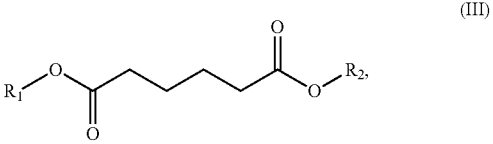

wherein $R_1$ and $R_2$ each independently comprise a linear or branched $C_1$-$C_{10}$ hydrocarbon group, with or without heteroatoms, whereby the emulsion is capable of emulsifying all or a portion of the residue oil, forming a resulting emulsion (i.e., emulsion with contaminants); b) separating substantially all of the resulting emulsion from the substrate; c) adding an amount of water or a solvent to the resulting emulsion effective to form at least a first phase layer comprising all or substantially all of the reside oil and a second phase layer comprising all or substantially all of the emulsion; and d) removing the first layer. In one embodiment, the blend of dibasic esters is derived from one or more by-products in the production of polyamide.

DETAILED DESCRIPTION

As used herein, the term "alkyl" means a saturated straight chain, branched chain, or cyclic hydrocarbon radical, including but not limited to, methyl, ethyl, n-propyl, iso-propyl, n-butyl, sec-butyl, t-butyl, pentyl, n-hexyl, and cyclohexyl.

As used herein, the terminology "($C_r$-$C_s$)" in reference to an organic group, wherein r and s are each integers, indicates that the group may contain from r carbon atoms to s carbon atoms per group.

The present invention is a method for treating a contaminated substrate. In one aspect, the method comprising the steps of a) contacting an emulsion to a substrate surface soiled with one or more contaminants, the emulsion comprising a blend of dibasic esters, whereby the emulsion is capable of emulsifying all or some of the contaminants, forming a resulting emulsion; and b) removing substantially all of the resulting emulsion from the substrate surface. Typically, the substrate is a recyclable plastic container, more typically, a recyclable plastic oil container containing residue oil that has been left over after use (e.g., utilized in connection with a car oil change). The plastic containers are generally broken down into smaller plastic chips before treatment, but is not necessary in utilizing in accordance to the methods described herein. The smaller plastic chips promote a greater surface area to which the emulsion can be applied.

It is also understood that the substrate can be of varying compositions such as metal, aluminum, and the like which may or may not be recyclable. Typically, the emulsion is a microemulsion. Without wishing to be bound to any theory, it is pointed out that microemulsions are generally thermodynamically stable systems generally comprising large amounts of emulsifiers. A microemulsion is not an emulsion, and is distinguishable from an emulsion in that the microemulsion is thermodynamically stable, which means it is at its lowest energy state. In comparison, an emulsion is only kinetically stable, which means the rate at which the emulsified phase is separating from the water is very slow. Microemulsion can be easily prepared by gentle mixing or shaking, and will not easily separate into separate phases or settle out. In one embodiment, the contaminant is reside oil that has been left over in a plastic oil container after use. The residue oil is typically motor oil suitable for an engine, but it is understood that any oil is capable of being utilized. In another embodiment, the contaminant is a particle or fluid residue that is not soluble in water.

The invention in one embodiment is also a method of recovering a contaminant from a substrate comprising: a) contacting an emulsion to a substrate surface soiled with at least one contaminant, the emulsion comprising a blend of dibasic esters, whereby the emulsion is capable of emulsifying all or a portion of the contaminant, forming a resulting emulsion; b) separating substantially all of the resulting emulsion from the substrate surface; c) adding an amount of water or a solvent to the resulting emulsion effective to form at least a first phase layer comprising a substantial amount of the contaminant and a second phase layer comprising a substantial amount of the emulsion; and d) removing the first phase layer.

Typically, the emulsion is contacted to the substrate and substrate surface through spraying. However, it understood that the emulsion can be contacted with the substrate through various other methods including but not limited to a batch process, such as for example, where the substrate is dipped or placed into a mixing vessel, or as a continuous process, such as for example, where a stream of the emulsion is contacted with the substrate.

In one typical embodiment, an aqueous micro-emulsion incorporating one or a mixture of ecofriendly solvents can be used to clean or remove oil from plastic chips. Further, the washed or emulsified oil can be recovered by destabilizing the emulsion so that at least two or three phases are present. This allows for separation of the aqueous phase. One of the phases is either an oil rich or a solvent oil mixture. The emulsion serves a two-fold purpose of (1) the capability of cleaning the oil off the plastic chips and (2) recovery of the oil by separating the oil from the resulting emulsion by destabilizing it. It is understood that the resulting emulsion is the emulsion-oil mixture.

Destabilizing the resulting emulsion can be accomplished, in one embodiment, by the addition of water (dilution) and/or various destabilizing additives (e.g. other non-water miscible solvents including but not limited to motor oil, demulsifiers, any flocculant, or salts) or, in another embodiment, by raising the temperature (30-90° C.) or lowering the temperature (<about 20° C.). Phase separation that results from the destabilization allows the oil to be recovered (usually separated in its own phase at the top). This facilitates the recovery of oil, the recovery of the emulsion or blend of dibasic esters and/or recovery of the aqueous phase.

In one embodiment, the resulting emulsion is diluted at a ratio of at least 1 part water to 1 part resulting emulsion. In another embodiment, the resulting emulsion is diluted at a ratio of at least 5 parts water to 1 part resulting emulsion. In yet another embodiment, the resulting emulsion is diluted at a ratio of at least 25 parts water to 1 part resulting emulsion. And in a further embodiment, the resulting emulsion is diluted at a ratio of at least 100 parts water to 1 part resulting emulsion.

In one embodiment, in order to destabilize the resulting emulsion at ambient temperature, the temperature of the resulting emulsion is raised by greater than 30° C., or in another embodiment raised by greater than 40° C., or in yet another embodiment raised by greater than 50° C., or in a further embodiment raised by greater than 60° C., or in yet another embodiment raised by greater than 90° C.

In another embodiment, in order to destabilize the resulting emulsion at ambient temperature, the temperature of the resulting emulsion is lowered by at least 20° C., or in another embodiment lowered by at least 25° C., or in yet another embodiment lowered by at least 30° C.

The emulsion comprises a blend of dibasic esters. In one embodiment, the blend comprises adducts of alcohol and linear diacids, the adducts having the formula $R_1$—OOC-A-COO—$R_2$ wherein $R_1$ and/or $R_2$ comprise, individually, a linear or branched $C_1$-$C_{12}$ alkyl with or without heteroatoms, more typically a $C_1$-$C_8$ alkyl, and A comprises a mixture of —$(CH_2)_4$—, —$(CH_2)_3$, and —$(CH_2)_2$—. In another embodiment, $R_1$ and/or $R_2$ comprise, individually, a $C_4$-$C_{12}$ alkyl, more typically a $C_4$-$C_8$ alkyl. In one embodiment, $R_1$ and $R_2$ can individually comprise a hydrocarbon group originating from fusel oil. In one embodiment, $R_1$ and $R_2$ individually can comprise a hydrocarbon group having 1 to 8 carbon atoms. In one embodiment, $R_1$ and $R_2$ individually can comprise a hydrocarbon group having 5 to 8 carbon atoms.

In one embodiment, the blend comprises adducts of alcohol and branched or linear diacids, the adducts having the formula R1-OOC-A-COO—R2 wherein R1 and/or R2 comprise, individually, a C1-C12 alkyl, more typically a C1-C8 alkyl, and A comprises a mixture of —(CH2)4-, —CH2CH2CH(CH3)-, and —CH2CH(C2H5)-. In another embodiment, R1 and/or R2 comprise, individually, a C4-C12 alkyl, more typically a C4-C8 alkyl. In one embodiment, the diacid portion may be derived from such dibasic acids such as adipic, succinic, glutaric, oxalic, malonic, pimelic, suberic and azelaic acids, as well as mixtures thereof.

One or more dibasic esters utilized herein can be prepared by any appropriate process. For example, a process for preparing the adduct of adipic acid and of fusel oil is, for example, described in the document "The Use of Egyptian Fusel Oil for the Preparation of Some Plasticizers Compatible with Polyvinyl Chloride", Chuiba et al., Indian Journal of Technology, Vol. 23, August 1985, pp. 309-311.

The dibasic esters can be obtained by a process comprising an "esterification" stage by reaction of a diacid of formula HOOC-A-COOH or of a diester of formula MeOOC-A-COOMe with a branched alcohol or a mixture of alcohols. The reactions can be appropriately catalyzed. Use is made, in one embodiment, of at least 2 molar equivalents of alcohols per diacid or diester. The reactions can, if appropriate, be promoted by extraction of the reaction by-products and followed by stages of filtration and/or of purification, for example by distillation.

The diacids in the form of mixtures can in particular be obtained from a mixture of dinitrile compounds in particular produced and recovered in the process for the manufacture of adiponitrile by double hydrocyanation of butadiene. This process, used on a large scale industrially to produce the greater majority of the adiponitrile consumed worldwide, is described in numerous patents and works. The reaction for the hydrocyanation of butadiene results predominantly in the formulation of linear dinitriles but also in formation of branched dinitriles, the two main ones of which are methylglutaronitrile and ethylsuccinonitrile. The branched dinitrile compounds are separated by distillation and recovered, for example, as top fraction in a distillation column, in the stages for separation and purification of the adiponitrile. The branched dinitriles can subsequently be converted to diacids or diesters (either to light diesters, for a subsequent transesterification reaction with the alcohol or the mixture of alcohols or the fusel oil, or directly to diesters in accordance with the invention).

Dibasic esters can be derived from one or more by-products in the production of polyamide, for example, polyamide 6,6. In one embodiment, the emulsion comprises a blend of linear or branched, cyclic or noncyclic, $C_1$-$C_{20}$ alkyl, aryl, alkylaryl or arylalkyl esters of adipic diacids, glutaric diacids, and succinic diacids. In another embodiment, the emulsion comprises a blend of linear or branched, cyclic or noncyclic, $C_1$-$C_{20}$ alkyl, aryl, alkylaryl or arylalkyl esters of adipic diacids, methylglutaric diacids, and ethylsuccinic diacids Generally, polyamide is a copolymer prepared by a condensation reaction formed by reacting a diamine and a dicarboxylic acid. Specifically, polyamide 6,6 is a copolymer prepared by a condensation reaction formed by reacting a diamine, typically hexamethylenediamine, with a dicarboxylic acid, typically adipic acid.

In one embodiment, the blend is derived from one or more by-products in the reaction, synthesis and/or production of adipic acid utilized in the production of polyamide, the emulsion comprising a blend of dialkyl esters of adipic diacids, glutaric diacids, and succinic diacids (herein referred to sometimes as "AGS" or the "AGS blend").

In one embodiment, the blend of esters is derived from by-products in the reaction, synthesis and/or production of hexamethylenediamine utilized in the production of polyamide, typically polyamide 6,6. The emulsion comprises a blend of dialkyl esters of adipic diacids, methylglutaric diacids, and ethylsuccinic diacids (herein referred to sometimes as "MGA", "MGN", "MGN blend" or "MGA blend").

The boiling point of the dibasic ester blend is between the range of about 120° C. to 450° C. In one embodiment, the boiling point of the blend is in the range of about 160° C. to 400° C.; in one embodiment, the range is about 210° C. to 290° C.; in another embodiment, the range is about 210° C. to 245° C.; in another embodiment, the range is the range is about 215° C. to 225° C. In one embodiment, the boiling point range of the blend is between about 210° C. to 390° C., more typically in the range of about 280° C. to 390° C., more typically in the range of 295° C. to 390° C. In one embodiment, boiling point of the blend is in the range of about 215° C. to 400° C., typically in the range of about 220° C. to 350° C.

In one embodiment, the blend of dibasic esters has a boiling point range of between about 300° C. and 330° C. Typically, the diisoamyl AGS blend is associated with this boiling point range. In another embodiment, the dibasic ester blend has a boiling point range of between about 295° C. and 310° C. Typically, the di-n-butyl AGS blend is associated with this boiling point range. Generally, a higher boiling point, typically, above 215° C., or high boiling point range corresponds to lower VOC.

In one embodiment, the emulsion which comprises (a) a blend of dialkyl esters of adipic, glutaric, and succinic diacids or a blend of dialkyl esters of adipic, methylglutaric, and ethylsuccinic diacids; (b) at least one surfactant; and, optionally, (c) water or a solvent. Additional components may be added. The surfactant can be any number of cationic, amphoteric, zwitterionic, anionic or nonionic surfactants, derivatives thereof, as well as blends of such surfactants.

In one embodiment, the nonionic surfactants generally includes one or more of for example amides such as alkanolamides, ethoxylated alkanolamides, ethylene bisamides; esters such as fatty acid esters, glycerol esters, ethoxylated fatty acid esters, sorbitan esters, ethoxylated sorbitan; ethoxylates such as alkylphenol ethoxylates, alcohol ethoxylates, tristyrylphenol ethoxylates, mercaptan ethoxylates; end-capped and EO/PO block copolymers such as ethylene oxide/propylene oxide block copolymers, chlorine capped ethoxylates, tetra-functional block copolymers; amine oxides such as lauramine oxide, cocamine oxide, stearamine oxide, stearamidopropylamine oxide, palmitamidopropylamine oxide, decylamine oxide; fatty alcohols such as decyl alcohol, lauryl alcohol, tridecyl alcohol, myristyl alcohol, cetyl alcohol, stearyl alcohol, oleyl alcohol, linoleyl alcohol and linolenyl alcohol; and alkoxylated alcohols such as ethoxylated lauryl alcohol, trideceth alcohols; and fatty acids such as lauric acid, oleic acid, stearic acid, myristic acid, cetearic acid, isostearic acid, linoleic acid, linolenic acid, ricinoleic acid, elaidic acid, arichidonic acid, myristoleic acid and mixtures thereof.

In another embodiment, the non-ionic surfactant is a glycol such as polyethylene glycol (PEG), alkyl PEG esters, polypropylene glycol (PPG) and derivatives thereof. In one embodiment, the surfactant is an alcohol ethoxylate, an alkyl phenol ethoxylate or a terpene alkoxylate. In one exemplary embodiment, the surfactant is a $C_6$-$C_{13}$ alcohol ethoxylate and, more typically, a $C_8$-$C_{12}$ alcohol ethoxylate.

In another embodiment, the surfactant is a cationic surfactant. The cationic surfactant includes but is not limited to quaternary ammonium compounds, such as cetyl trimethyl ammonium bromide (also known as CETAB or cetrimonium bromide), cetyl trimethyl ammonium chloride (also known as cetrimonium chloride), myristyl trimethyl ammonium bromide (also known as myrtrimonium bromide or Quaternium-13), stearyl dimethyl distearyldimonium chloride, dicetyl dimonium chloride, stearyl octyldimonium methosulfate, dihydrogenated palmoylethyl hydroxyethylmonium methosulfate, isostearyl benzylimidonium chloride, cocoyl benzyl hydroxyethyl imidazolinium chloride, dicetyl dimonium chloride and distearyldimonium chloride; isostearylaminopropalkonium chloride or olealkonium chloride; behentrimonium chloride; as well as mixtures thereof.

In another embodiment, the surfactant is an anionic surfactant. The anionic surfactant includes but is not limited to linear alkylbenzene sulfonates, alpha olefin sulfonates, paraffin sulfonates, alkyl ester sulfonates, alkyl sulfates, alkyl alkoxy sulfates, alkyl sulfonates, alkyl alkoxy carboxylates, alkyl alkoxylated sulfates, monoalkyl phosphates, dialkyl phosphates, sarcosinates, sulfosuccinates, isethionates, and taurates, as well as mixtures thereof. In one embodiment, anionic surfactants that are suitable as the anionic surfactant component of the emulsion include, for example, ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium lauryl sulfate, potassium laureth sulfate, sodium-monoalkyl phosphates, sodium dialkyl phosphates, sodium lauroyl sarcosinate, lauroyl sarcosine, cocoyl sarcosine, ammonium cocyl sulfate, ammonium lauryl sulfate, sodium cocyl sulfate, sodium trideceth sulfate, sodium tridecyl sulfate, ammonium trideceth sulfate, ammonium tridecyl sulfate, sodium cocoyl isethionate, disodium laureth sulfosuccinate, sodium methyl oleoyl taurate, sodium laureth carboxylate, sodium trideceth carboxylate, sodium lauryl sulfate, potassium cocyl sulfate, potassium lauryl sulfate, monoethanolamine cocyl sulfate, sodium tridecyl benzene sulfonate, and sodium dodecyl benzene sulfonate. Branched anionic surfactants are particularly preferred, such as sodium trideceth sulfate, sodium tridecyl sulfate, ammonium trideceth sulfate, ammonium tridecyl sulfate, and sodium trideceth carboxylate.

Any amphoteric surfactant that is acceptable for use includes but is not limited to derivatives of aliphatic secondary and tertiary amines in which the aliphatic radical can be straight chain or branched and wherein one of the aliphatic substituents contains from about 8 to about 18 carbon atoms and one contains an anionic water solubilizing group. Specific examples of suitable amphoteric surfactants include the alkali metal, alkaline earth metal, ammonium or substituted ammonium salts of alkyl amphocarboxy glycinates and alkyl amphocarboxypropionates, alkyl amphodipropionates, alkyl amphodiacetates, alkyl amphoglycinates, and alkyl amphopropionates, as well as alkyl iminopropionates, alkyl iminodipropionates, and alkyl amphopropylsulfonates, such as for example, cocoamphoacetate cocoamphopropionate, cocoamphodiacetate, lauroamphoacetate, lauroamphodiacetate, lauroamphodipropionate, lauroamphodiacetate, cocoamphopropyl sulfonate caproamphodiacetate, caproamphoacetate, caproamphodipropionate, and stearoamphoacetate.

Suitable zwitterionic surfactants include alkyl betaines, such as cocodimethyl carboxymethyl betaine, lauryl dimethyl carboxymethyl betaine, lauryl dimethyl alpha-carboxyethyl betaine, cetyl dimethyl carboxymethyl betaine, lauryl bis-(2-hydroxy-ethyl)carboxy methyl betaine, stearyl bis-(2-hydroxy-propyl)carboxymethyl betaine, oleyl dimethyl gamma-carboxypropyl betaine, and lauryl bis-(2-hydroxypropyl)alpha-carboxyethyl betaine, amidopropyl betaines, and alkyl sultaines, such as cocodimethyl sulfopropyl betaine, stearyldimethyl sulfopropyl betaine, lauryl dimethyl sulfoethyl betaine, lauryl bis-(2-hydroxy-ethyl)sulfopropyl betaine, and alkylamidopropylhydroxy sultaines.

In one embodiment, the emulsion is a microemulsion comprising (a) a blend of about 70-90% dialkyl dimethylglutarate, about 5-30% dialkyl ethylsuccinate and about 0-10% dialkyl adipate; (b) a surfactant composition comprising i) an alcohol alkoxylate, a terpene alkoxylate, or derivatives thereof; (c) a delaminate and (d) water. Each alkyl substituent individually chosen from a hydrocarbon group containing from about 1 to 8 hydrocarbons such as methyl or ethyl, propyl, isopropyl, butyl, n-butyl or pentyl, or iso-amyl groups. Optionally, one or more additives or additional components such as delaminating agents, buffering and/or pH control agents, fragrances, opacifying agents, anti-corrosion agents, whiteners, defoamers, dyes, sudsing control agents, stabilizers, thickeners and the like can be added to the emulsion.

According to one embodiment, the blend of dibasic esters corresponds to one or more by-products of the preparation of adipic acid, which is one of the main monomers in polyamides. For example, the dialkyl esters are obtained by esterification of one by-product, which generally contains, on a weight basis, from 15 to 33% succinic acid, from 50 to 75% glutaric acid and from 5 to 30% adipic acid. As another example, the dialkyl esters are obtained by esterification of a second by-product, which generally contains, on a weight basis, from 30 to 95% methyl glutaric acid, from 5 to 20% ethyl succinic acid and from 1 to 10% adipic acid. It is understood that the acid portion may be derived from such dibasic acids such as, adipic, succinic, glutaric, oxalic, malonic, pimelic, suberic and azelaic acids, as well as mixtures thereof.

The blend of dibasic esters is typically present in microemulsion form (liquid droplets dispersed in the aqueous phase). Without wishing to be bound to any theory, it is pointed out that microemulsions are generally thermodynamically stable systems generally comprising large amounts of emulsifiers. The other emulsions (miniemulsions and macroemulsions) are generally systems in thermodynamically unstable state, conserving for a certain time, in metastable state, the mechanical energy supplied during the emulsification. These systems generally comprise smaller amounts of emulsifiers.

In one embodiment, the microemulsion has a mean droplet size is generally less than or equal to about 0.15 μm. The size of the microemulsion droplets may be measured by dynamic light scattering (DQEL), for example as described below. The apparatus used consists, for example, of a Spectra-Physics 2020 laser, a Brookhaven 2030 correlator and the associated computer-based equipment. If the sample is concentrated, it may be diluted in deionized water and filtered through a 0.22 μm filter to have a final concentration of 2% by weight. The diameter obtained is an apparent diameter. The measurements are taken at angles of 90° and 135°. For the size measurements, besides the standard analysis with cumulents, three exploitations of the autocorrelation function are used (exponential sampling or EXPSAM described by Prof. Pike, the "Non Negatively Constrained Least Squares" or NNLS method, and the CONTIN method described by Prof. Provencher), which each give a size distribution weighted by the scattered intensity, rather than by the mass or the number. The refractive index and the viscosity of the water are taken into account.

According to one embodiment, the microemulsion is transparent. The microemulsion may have, for example, a transmittance of at least 90% and preferably of at least 95% at a wavelength of 600 nm, for example measured using a Lambda 40 UV-visible spectrometer.

According to another embodiment, the emulsion is an emulsion whose mean droplet size is greater than or equal to 0.15 μm, for example greater than 0.5 μm, or 1 μm, or 2 μm, or 10 μm, or 20 μm, and preferably less than 100 μm. The droplet size may be measured by optical microscopy and/or laser granulometry (Horiba LA-910 laser scattering analyzer).

In certain embodiments, the dibasic ester blend comprises:
a diester of formula I:

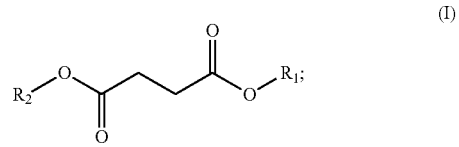

a diester of formula II:

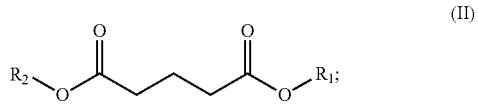

and
a diester of formula III:

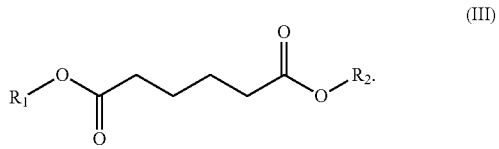

$R_1$ and/or $R_2$ can individually comprise a hydrocarbon having from about 1 to about 8 carbon atoms, typically, methyl, ethyl, propyl, isopropyl, butyl, isobutyl, n-butyl, isoamyl, hexyl, heptyl or octyl. In such embodiments, the blend typically comprises (by weight of the blend) (i) about 15% to about 35% of the diester of formula I, (ii) about 55% to about 70% of the diester of formula II, and (iii) about 7% to about 20% of the diester of formula III, and more typically, (i) about 20% to about 28% of the diester of formula I, (ii) about 59% to about 67% of the diester of formula II, and (iii) about 9% to about 17% of the diester of formula III. The blend is generally characterized by a flash point of 98° C., a vapor pressure at 20° C. of less than about 10 Pa, and a distillation temperature range of about 200-300° C. Mention may also be made of Rhodiasolv® RPDE (Rhodia Inc., Cranbury, N.J.), Rhodiasolv® DIB (Rhodia Inc., Cranbury, N.J.) and Rhodiasolv® DEE (Rhodia Inc., Cranbury, N.J.).

In certain other embodiments, the dibasic ester blend comprises:

a diester of the formula IV:

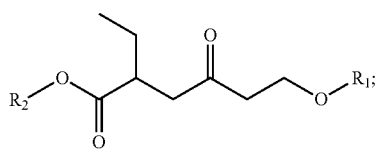

(IV)

a diester of the formula V:

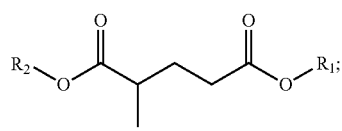

(V)

and
a diester of the formula VI:

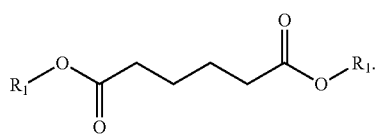

(VI)

$R_1$ and/or $R_2$ can individually comprise a hydrocarbon having from about 1 to about 8 carbon atoms, typically, methyl, ethyl, propyl, isopropyl, butyl, isobutyl, n-butyl, isoamyl, hexyl, heptyl, or octyl. In such embodiments, the blend typically comprises (by weight of the blend) (i) from about 5% to about 30% of the diester of formula IV, (ii) from about 70% to about 95% of the diester of formula V, and (iii) from about 0% to about 10% of the diester of formula VI. More typically, the blend typically comprises (by weight of the blend): (i) from about 6% to about 12% of the diester of formula IV, (ii) from about 86% to about 92% of the diester of formula V, and (iii) from about 0.5% to about 4% of the diester of formula VI.

Most typically, the blend comprises (by weight of the blend): (i) about 9% of the diester of formula IV, (ii) about 89% of the diester of formula V, and (iii) about 1% of the diester of formula VI. The blend is generally characterized by a flash point of 98° C., a vapor pressure at 20° C. of less than about 10 Pa, and a distillation temperature range of about 200-275° C. Mention may be made of Rhodiasolv® IRIS and Rhodiasolv® DEE/M, manufactured by Rhodia Inc. (manufactured by Rhodia Inc., Cranbury, N.J.)

In one embodiment, water can include but is not limited to tap water, filtered water, bottled water, spring water, distilled water, deionized water, and/or industrial soft water.

Typically nonionic surfactants are utilized, which include but are not limited to polyalkoxylated surfactants, for example chosen from alkoxylated alcohols, alkoxylated fatty alcohols, alkoxylated triglycerides, alkoxylated fatty acids, alkoxylated sorbitan esters, alkoxylated fatty amines, alkoxylated bis(1-phenylethyl)phenols, alkoxylated tris(1-phenylethyl)phenols and alkoxylated alkylphenols, in which the number of alkoxy and more particularly oxyethylene and/or oxypropylene units is such that the HLB value is greater than or equal to 10. More typically, the nonionic surfactant can be selected from the group consisting of ethylene oxide/propylene oxide copolymers, terpene alkoxylates, alcohol ethoxylates, alkyl phenol ethoxylates and combinations thereof.

In one embodiment, the alcohol ethoxylates used have the formula:

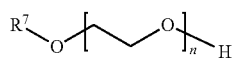

(VIII)

Typically, $R^7$ is a hydrogen or a hydrocarbon chain containing about 5 to about 25 carbon atoms, more typically from about 7 to about 14 carbon atoms, most typically, from about 8 to about 13 carbon atoms, and may be branched or straight-chained and saturated or unsaturated and is selected from the group consisting of hydrogen, alkyl, alkoxy, aryl, alkaryl, alkylarylalkyl and arylalkyl. Typically, "n" is an integer from about 1 to about 30, more typically an integer from 2 to about 20, and most typically an integer from about 3 to about 12.

In an alternative embodiment, the alcohol ethoxylate is sold under the trade name Rhodasurf 91-6 (manufactured by Rhodia Inc., Cranbury, N.J.).

In yet another embodiment, surfactants used are non-ionic surfactants including but not limited to: polyoxyalkylenated $C_6$-$C_{24}$ aliphatic alcohols comprising from 2 to 50 oxyalkylene (oxyethylene and/or oxypropylene) units, in particular of those with 12 (mean) carbon atoms or with 18 (mean) carbon atoms; mention may be made of Antarox B12DF, Antarox FM33, Antarox FM63 and Antarox V74, Rhodasurf ID 060, Rhodasurf ID 070 and Rhodasurf LA 42 from (Rhodia Inc., Cranbury, N.J.), as well as polyoxyalkylenated $C_8$-$C_{22}$ aliphatic alcohols containing from 1 to 25 oxyalkylene (oxyethylene or oxypropylene) units.

In a further embodiment, the surfactant comprises a terpene or a terpene alkoxylate. Terpene alkoxylates are terpene-based surfactants derived from a renewable raw materials such as α-pinene and β-pinene, and have a C-9 bicyclic alkyl hydrophobe and polyoxy alkylene units in an block distribution or intermixed in random or tapered distribution along the hydrophilic chain. The terpene alkoxylate surfactants are described in the U.S. Patent Application Publication No. 2006/0135683 to Adam al., Jun. 22, 2006, is incorporated herein by reference.

Typical terpene alkoxylates are Nopol alkoxylate surfactants and have the general formula:

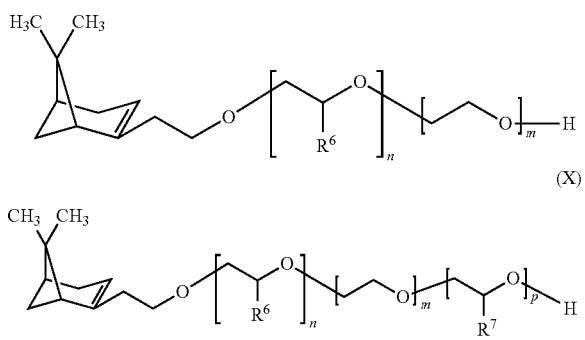

where $R^6$ and $R^7$ are, individually, hydrogen, $CH_3$, or $C_2H_5$; "n" is from about 1 to about 30; "m" is from about 0 to about 20; and "p" is from about 0 to 20. The "n", "m" and/or "p" units may be of block distribution or intermixed in random or tapered distribution along the chain.

In another embodiment, $R^6$ is $CH_3$; "n" is from about 20 to about 25; "m" is from about 5 to about 10. In yet another embodiment, $R^6$ and $R^7$ are individually $CH_3$; "n" is from about 1 to about 8; "m" is from about 2 to about 14; and "p" is from about 10 to about 20. Mention can be made of Rhodoclean® HP (a terpene EO/PO)(manufactured by Rhodia Inc., Cranbury, N.J.) and Rhodoclean® MSC (a terpene EO/PO)(manufactured by Rhodia Inc., Cranbury, N.J.).

In a further or alternative embodiment, the emulsion further comprises additional components or additives. The additional components include, but are not limited to, delaminates, buffering and/or pH control agents, fragrances, perfumes, defoamers, dyes, whiteners, brighteners, solubilizing materials, stabilizers, thickeners, corrosion inhibitors, lotions and/or mineral oils, enzymes, cloud point modifiers, preservatives, ion exchangers, chelating agents, sudsing control agents, soil removal agents, softening agents, opacifiers, inert diluents, graying inhibitors, stabilizers, polymers and the like.

Some additional components comprise one or more delaminates. Delaminates can be certain terpene-based derivatives that can include, but are not limited to, pinene and pinene derivatives, d-limonene, dipentene and oc-pinene.

The buffering and pH control agents include for example, organic acids, mineral acids, as well as alkali metal and alkaline earth salts of silicate, metasilicate, polysilicate, borate, carbonate, carbamate, phosphate, polyphosphate, pyrophosphates, triphosphates, ammonia, hydroxide, monoethanolamine, monopropanolamine, diethanolamine, dipropanolamine, triethanolamine, and/or 2-amino-2methylpropanol.

Since dibasic esters are subject to hydrolysis under certain conditions, it is understood that the blend of dibasic esters can contain a minute amount of alcohol, typically a low molecular weight alcohol such as ethanol, in concentrations of about 2% to about 0.2%.

A generally contemplated composition of emulsion, in one embodiment, comprises (based on the total weight of the emulsion) (a) from about 1% to about 60% by weight a blend of dibasic esters and (b) from about 1% to about 65% by weight one or more surfactants.

Experiments

A micro-emulsion was formulated with dibasic ester (in the specific example, Rhodiasolv® IRIS) that could emulsify motor oil, which is then recovered it through destabilization of the emulsion. FIG. 1 demonstrates this process. Pennzoil® motor oil (10W-40) was added to DV-9015 (IRIS/MSC with Rhodasurf 91.6 micro-emulsion) to emulsify the oil. Based on total weight of the emulsion, DV-9015 comprises about 20-35 wt % of Rhodiasolv® Iris, about 2-13 wt % Terpene EO/PO, about 20-40 wt % $C_8$-$C_{13}$ alcohol ethoxylate, and about 20-40 wt % water.

Upon addition of water and enhanced separation (centrifuge was a way to speed up the effect of gravity) three different phases appeared. The oil phase was on top, the water phase was in the middle and the IRIS phase was on the bottom. The oil can then be recovered as a result of the phase separation.

The micro-emulsion was also tested with plastic chips from motor-oil bottles to be recycled. It was observed that when the chips were soaked in the micro-emulsion the oil could be removed from the plastic. The chips were then separated from the micro emulsion by filtration through a coarse screen to remove the chips. The chips were also rinsed with a small amount of water to remove any excess surfactant/micro emulsion. When the washed chips were air dried and they were found to be dry to the touch with no detectable oil on them. The filtrate (or decanted) micro-emulsion wash has oil contained in it. Upon simple dilution by addition of water the filtrate separates into two primary phases with the IRIS phase on the bottom. A thin top phase appears to have some oil for easy recovery too. In this case, the oil partitions into two phases with the bulk of the oil in the IRIS rich phase. The oil may be recovered from the IRIS or utilized as an aftermarket fuel for energy recovery.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention.

What is claimed is:

1. A method for cleaning a contaminated substrate comprising the steps of:
    a) contacting an emulsion to a substrate surface soiled with at least one contaminant, the emulsion comprising a blend of dibasic esters, whereby the emulsion is capable of emulsifying the at least one contaminant, forming a resulting emulsion;
    b) removing substantially all of the resulting emulsion from the substrate surface; and
    c) adding an amount of water or a solvent to the resulting emulsion effective to form at least a first phase layer comprising a substantial amount of the contaminant and a second phase layer comprising a substantial amount of the emulsion.

2. The method of claim 1 wherein the at least one contaminant comprises residue oil.

3. The method of claim 1 wherein the substrate is a recyclable plastic substrate.

4. The method of claim 1 wherein a blend of dibasic esters has a general formula:

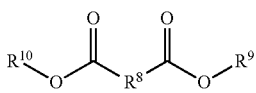

wherein $R^9$ and $R^{10}$ independently comprise a hydrocarbon chain containing about 1 to about 10 carbon atoms, and wherein $R^8$ is a mixture of at least two of —$CH_2$—$CH_2$—$CH_2$—$CH_2$—, —$CH(CH_3)$—$CH_2$—$CH_2$—, and —$CH(C_2H_5)$—$CH_2$—.

5. The method of claim 1 wherein the blend of dibasic esters comprises:
(i) about 7-14%, by weight of the blend, a dibasic ester of formula:

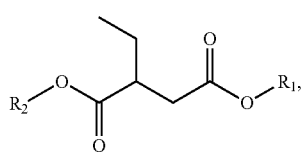

(ii) about 80-94%, by weight of the blend, a dibasic ester of formula

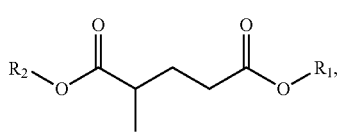

and
(iii) about 0.5-5%, by weight of the blend, a dibasic ester of formula

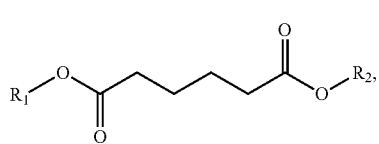

wherein $R_1$ and $R_2$ each independently comprise a $C_1$-$C_{10}$ hydrocarbon group.

6. The method of claim 1 wherein the emulsion comprises:
(a) a blend of dibasic esters comprising (i) a dialkyl methylglutarate and (ii) at least one of a dialkyl adipate or a dialkyl ethylsuccinate; and
(b) a surfactant selected from the group consisting of an anionic surfactant, a cationic surfactant, an amphoteric surfactant, a zwitterionic surfactant, a nonionic surfactant and any combination thereof.

7. The method of claim 1 wherein the emulsion further comprises at least one surfactant and, optionally, water.

8. The method of claim 6 wherein the surfactant is chosen from the group consisting of terpene alkoxylate, an alcohol alkoxylate and any combination thereof.

9. The method of claim 1 further comprising the step of:
d) imparting a force to the resulting emulsion, whereby the force promotes phase separation of the resulting emulsion.

10. The method of claim 1 wherein the emulsion is a microemulsion.

11. The method of claim 1 further comprising the step of:
c) adding at least one destabilizing additive to the resulting emulsion, thereby forming at least a first phase layer comprising a substantial amount of the contaminant and a second phase layer comprising a substantial amount of the emulsion.

12. The method of claim 11 further comprising the step of:
d) imparting a force to the resulting emulsion, whereby the force promotes phase separation of the resulting emulsion.

13. The method of claim 1 further comprising the step of:
c) heating the resulting emulsion to a predetermined temperature, thereby forming at least a first phase layer comprising a substantial amount of contaminants and a second phase layer comprising a substantial amount of the emulsion.

14. The method of claim 13 further comprising the step of:
d) applying a force to the resulting emulsion, whereby the force promotes phase separation of the resulting emulsion.

15. A method of recovering a contaminant from a substrate comprising:
a) contacting an emulsion to a substrate surface soiled with at least one contaminant, the emulsion comprising a blend of dibasic esters, whereby the emulsion is capable of emulsifying the contaminant, forming a resulting emulsion;
b) separating the resulting emulsion from the substrate surface;
c) adding an amount of water or a solvent to the resulting emulsion effective to form at least a first phase layer comprising a substantial amount of the contaminant and a second phase layer comprising a substantial amount of the emulsion; and
d) separating the first phase layer from the second phase layer.

16. The method of claim 15 wherein the blend comprises:
(i) about 7-14%, by weight of the blend, a dibasic ester of formula:

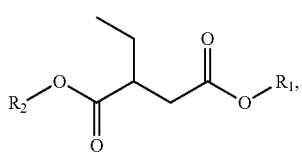

(ii) about 80-94%, by weight of the blend, a dibasic ester of formula

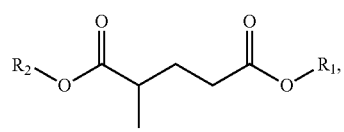

and
(iii) about 0.5-5%, by weight of the blend, a dibasic ester of formula

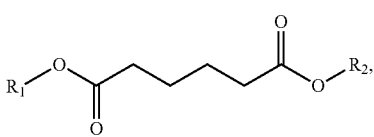

wherein $R_1$ and $R_2$ each independently comprise a $C_1$-$C_{10}$ hydrocarbon group.

17. A method of recovering residue oil from a substrate comprising:
    a) contacting an emulsion to a substrate surface soiled with residue oil, the emulsion comprising a blend of dibasic esters:
        (i) about 7-14%, by weight of the blend, a dibasic ester of formula:

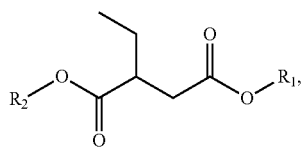

(ii) about 80-94%, by weight of the blend, a dibasic ester of formula

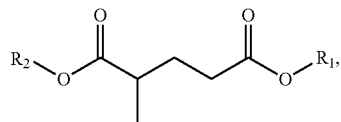

and (iii) about 0.5-5%, by weight of the blend, a dibasic ester of formula

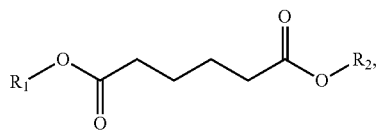

wherein $R_1$ and $R_2$ each independently comprise a $C_1$-$C_{10}$ hydrocarbon group,
whereby the emulsion is capable of emulsifying all or a portion of the residue oil, forming a resulting emulsion;
    b) separating all or substantially all the resulting emulsion from the substrate;
    c) adding an amount of water or a solvent to the resulting emulsion effective to form at least a first phase layer comprising a substantial amount of the reside oil and a second phase layer comprising a substantial amount of the emulsion; and
    d) separating the first phase layer from the second phase layer.

18. The method of claim 17 wherein the blend of dibasic esters is derived from one or more by-products in the production of polyamide.

19. The method of claim 17 wherein the blend of dibasic esters is derived from adiponitrile.

20. The method of claim 17 wherein the emulsion further comprises a surfactant, wherein the blend of dibasic esters comprises from about 1% to about 60% by weight of the emulsion, and wherein the surfactant comprises from about 1% to about 65% by weight of the emulsion.

21. The method of claim 17 wherein the emulsion further comprising an additive selected from the group consisting of delaminates, buffering agents, fragrances, perfumes, defoamers, dyes, whiteners, brighteners, solubilizing materials, stabilizers, thickeners, corrosion inhibitors, lotions, mineral oils, enzymes, cloud point modifiers, particles, preservatives, ion exchangers, chelating agents, sudsing control agents, soil removal agents, softening agents, opacifiers, inert diluents, graying inhibitors, stabilizers, polymers and any combination thereof.

22. The method of claim 21 wherein the additive comprises from about 0.1% to about 40% by weight of the emulsion.

* * * * *